United States Patent [19]
Cerny

[11] Patent Number: 5,690,884
[45] Date of Patent: Nov. 25, 1997

[54] METHOD OF INJECTION MOLDING A THIN WALLED ARTICLE

[75] Inventor: Zdenek Frank Cerny, Covina, Calif.

[73] Assignee: Kimberly-Clark Worldwide, Inc., Neenah, Wis.

[21] Appl. No.: 434,894

[22] Filed: May 4, 1995

[51] Int. Cl.$^6$ ............................ B29C 45/40; B29C 45/64
[52] U.S. Cl. .................... 264/328.1; 264/334; 425/577; 425/438
[58] Field of Search .................... 425/577, 438; 264/328.1, 336, 334

[56] References Cited

U.S. PATENT DOCUMENTS

| | | | |
|---|---|---|---|
| 3,028,630 | 4/1962 | Walker | 264/328.1 |
| 3,049,759 | 8/1962 | Eberhardt | 425/438 |
| 3,196,873 | 7/1965 | Bletzinger et al. | 604/15 |
| 3,264,691 | 8/1966 | Whitehead | 28/120 |
| 3,369,544 | 2/1968 | Crockford | 604/15 |
| 3,433,225 | 3/1969 | Voss et al. | 604/14 |
| 3,469,286 | 9/1969 | Crockford | 28/120 |
| 3,499,447 | 3/1970 | Mattes et al. | 604/12 |
| 3,608,441 | 9/1971 | Johnson | 493/296 |
| 3,625,787 | 12/1971 | Radl et al. | 156/73.2 |
| 3,643,661 | 2/1972 | Crockford | 604/15 |
| 3,645,263 | 2/1972 | Bates | 604/18 |
| 3,683,759 | 8/1972 | Voss et al. | 493/231 |
| 3,736,903 | 6/1973 | Townsend | 118/218 |
| 3,737,512 | 6/1973 | Stalter | 264/297 |
| 3,746,493 | 7/1973 | Stalter | 425/250 |
| 3,765,417 | 10/1973 | Crockford | 128/263 |
| 3,796,407 | 3/1974 | Brown | 249/63 |
| 3,805,786 | 4/1974 | Bernardin et al. | 128/263 |
| 3,830,236 | 8/1974 | Hanke | 128/263 |
| 3,882,869 | 5/1975 | Hanke | 128/263 |
| 3,895,634 | 7/1975 | Berger et al. | 128/263 |
| 3,930,777 | 1/1976 | Ramsey | 425/190 |
| 4,050,667 | 9/1977 | Kossett | 249/82 |
| 4,154,566 | 5/1979 | Ward | 425/451.3 |
| 4,184,834 | 1/1980 | Barber | 425/548 |
| 4,274,617 | 6/1981 | Schriever | 249/63 |
| 4,276,881 | 7/1981 | Lilaonitkul | 128/263 |
| 4,326,527 | 4/1982 | Wollangk et al. | 128/285 |
| 4,543,086 | 9/1985 | Johnson | 604/11 |

(List continued on next page.)

FOREIGN PATENT DOCUMENTS

| | | | |
|---|---|---|---|
| 833201 | 2/1970 | Canada . | |
| 882951 | 10/1971 | Canada . | |
| 914628 | 11/1972 | Canada . | |
| 943703 | 3/1974 | Canada . | |
| 945703 | 4/1974 | Canada | 2/115 |
| 0243250 | 10/1987 | European Pat. Off. . | |
| 0585906A2 | 9/1994 | European Pat. Off. . | |
| 46-12911 | 4/1971 | Japan . | |
| 46-24546 | 7/1971 | Japan . | |
| 53-127559 | 7/1978 | Japan . | |
| 1108291 | 4/1968 | United Kingdom . | |
| 2202750 | 10/1988 | United Kingdom . | |
| 2211097 | 6/1989 | United Kingdom . | |

Primary Examiner—Jan H. Silbaugh
Assistant Examiner—Mark Eashoo
Attorney, Agent, or Firm—Thomas J. Connelly

[57] ABSTRACT

A method for injection molding a thin walled article. The apparatus includes a mold having first and second mold blocks which are designed to mate with one another and form a mold cavity therebetween. The mold cavity has a peripheral surface and first and second ends. The apparatus also includes a third mold block which is designed to mate with the first and second mold blocks and closes off the first end of the mold cavity. The third mold block has an elongated core pin which extends into the mold cavity when the third mold block mates with the first and second mold blocks. The apparatus further includes a lifter designed to mate with the first and second mold blocks and closes off the second end of the mold cavity. The core pin engages with the lifter thereby maintaining a radial distance between it's outer periphery and the peripheral surface of the mold cavity. Lastly, the apparatus includes injection means for delivering a predetermined quantity of molten material to the mold cavity at a desired time to mold the thin walled article. The method of injection molding the thin walled article includes the sequential steps of opening and closing the various members of the mold.

6 Claims, 2 Drawing Sheets

U.S. PATENT DOCUMENTS

| | | | |
|---|---|---|---|
| 4,650,459 | 3/1987 | Sheldon | 604/15 |
| 4,676,773 | 6/1987 | Sheldon | 604/16 |
| 4,721,280 | 1/1988 | Barainsky | 249/185 |
| 4,726,805 | 2/1988 | Sanders, III | 604/15 |
| 4,743,237 | 5/1988 | Sweere | 604/358 |
| 4,753,413 | 6/1988 | Haigh | 249/64 |
| 4,755,166 | 7/1988 | Olmstead | 604/11 |
| 4,765,938 | 8/1988 | Schmidt et al. | 264/269 |
| 4,775,377 | 10/1988 | Sweere | 604/904 |
| 4,792,326 | 12/1988 | Tews | 604/11 |
| 4,856,980 | 8/1989 | Laurita | 425/572 |
| 4,857,044 | 8/1989 | Lennon | 604/14 |
| 4,872,933 | 10/1989 | Tews | 156/184 |
| 4,900,299 | 2/1990 | Webb | 604/11 |
| 4,911,687 | 3/1990 | Stewart et al. | 604/15 |
| 4,929,167 | 5/1990 | Pepper | 425/325 |
| 5,002,526 | 3/1991 | Herring | 604/11 |
| 5,037,597 | 8/1991 | McGinley et al. | 264/238 |
| 5,041,080 | 8/1991 | Shimatani et al. | 604/13 |
| 5,100,435 | 3/1992 | Onwumere | 8/115.55 |
| 5,137,442 | 8/1992 | Starkey | 425/438 |
| 5,158,535 | 10/1992 | Paul et al. | 604/15 |
| 5,225,215 | 7/1993 | Syvrud | 425/438 |
| 5,267,953 | 12/1993 | Paul et al. | 604/15 |
| 5,356,590 | 10/1994 | Melanson | 425/438 |

METHOD OF INJECTION MOLDING A THIN WALLED ARTICLE

FIELD OF THE INVENTION

This invention relates to an apparatus and method of injection molding a thin walled article. More specifically, this invention relates to an apparatus and method of injection molding an arcuately-shaped inner tube for a two-piece tampon applicator.

BACKGROUND OF THE INVENTION

Presently, thin walled articles, such as tubes, for use as the plunger member in a two-piece tampon applicator have been extrusion formed. Extrusion forming enables large quantities of such tubes to be manufactured quickly and in a cost effective manner. With advancement in injection molding equipment and technology, it has now become possible to injection mold such tubes. However, the cost to injection mold an article is still relatively high due to long cycle time, mold design and a limited quantity of tubes which can be molded per cycle. Advancements in the composition of thermoplastics as well as the capability to utilize larger size injection molds, which can turn out more tubes per cycle, is making injection molding of thin walled articles more economical.

In addition to the above advancements in injection molding technology, there has been a heightened awareness of environmental issues by consumers. Today, it is recognized that articles made from biodegradable materials which can quickly degrade are better for the ecology. In feminine care products, particularly tampon applicators, there is a strong desire by the consumer for products that are both water dispersible and biodegradable. It order to meet this need, new thermoplastic resins are being developed. Furthermore, manufacturers have made quantum leaps in minimizing the amount of non-biodegradable material used in their products. These two facts have led to the design of thin walled tubes which can be utilized as the plunger member of a two-piece tampon applicator. By a thin walled tube it is meant a tube having a wall thickness of less than about 0.05 inches (about 1.3 mm).

In order to manufacture such thin walled tubes, it has been found that standard extrusion molding techniques are not capable of constantly producing quality parts requiring close tolerances.

Now an apparatus and method for injection molding thin walled tubes from a thermoplastic material have been invented. The apparatus and method allow such tubes to be injection molded in an efficient manner and at a relatively low cost.

SUMMARY OF THE INVENTION

Briefly, this invention relates to an apparatus and method for injection molding a thin walled article, especially a thin walled tube. The apparatus includes a mold having first and second mold blocks which are designed to mate with one another and form a cavity therebetween. The cavity has a peripheral surface and first and second ends. The apparatus also includes a third mold block which is designed to mate with the first and second mold blocks and close off the first end of the cavity. The third mold block has an elongated core pin which extends into the cavity when the third mold block mates with the first and second mold blocks. The apparatus further includes a lifter designed to mate with the first and second mold blocks and close off the second end of the cavity. The core pin engages with the lifter so as to maintain a radial distance from the peripheral surface of the cavity. Lastly, the apparatus includes an injector for delivering a predetermined quantity of molten material to the cavity at a desired time to mold the thin walled tube.

The method of injection molding the thin walled article includes the steps of sequentially moving the lifter and the third mold block into registration with the second mold block. As the third mold block moves into position, the core pin will mate with the lifter to assure that a predetermined clearance is maintained between the core pin and the inner periphery of the mold cavity. The first and second mold blocks are then closed to form the mold cavity and molten material is introduced into this cavity via the injector. After the material has solidified into a thin walled article, the mold is opened by first separating the first and second mold blocks. The third mold block is then withdrawn and this action removes the core pin from inside the finished molded article. Lastly, the lifter is moved away so that the finished molded article can be removed from the mold.

The general object of this invention is to provide an apparatus and method for injection molding a thin walled article. A more specific object of this invention is to provide an apparatus and method for injection molding an arcuately-shaped inner tube for a two-piece tampon applicator.

Another object of this invention is to provide an apparatus which can injection mold an arcuately-shaped tube.

A further object of this invention is to provide an apparatus which utilizes first, second and third mold blocks, with the third mold block being movable at an angle relative to the first and second mold blocks so that an arcuately-shaped article can be molded.

Still another object of this invention is to provide an economical method of injection molding thin walled articles.

Still further, an object of this invention is to provide a method of injection molding arcuately-shaped, thin walled articles very quickly.

Other objects and advantages of the present invention will become more apparent to those skilled in the art in view of the following description and the accompanying drawings.

DETAILED DESCRIPTION OF THE PREFERRED EMBODIMENT

Figure 1:
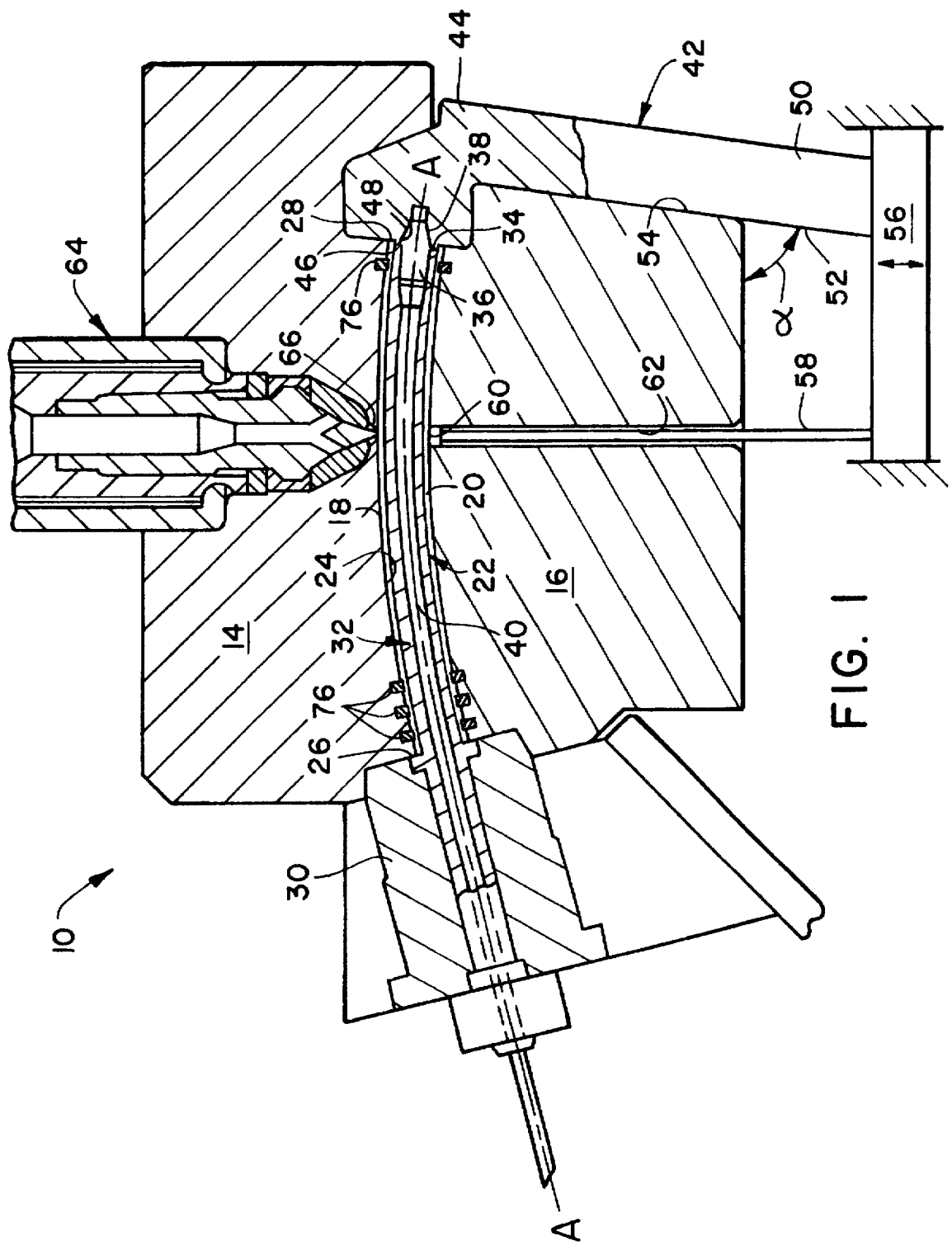
FIG. 1 is a schematic representation of an injection mold utilizing first and second separable mold blocks, a movable third mold block with a core pin secured thereto and a movable lifter mechanism.
Figure 2:
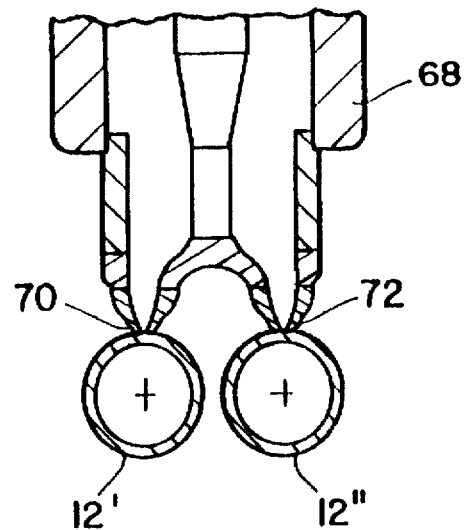
FIG. 2 is a cross-sectional view of an injection nozzle having a pair of outlets which can simultaneously injection mold two hollow articles situated side by side.
Figure 3:
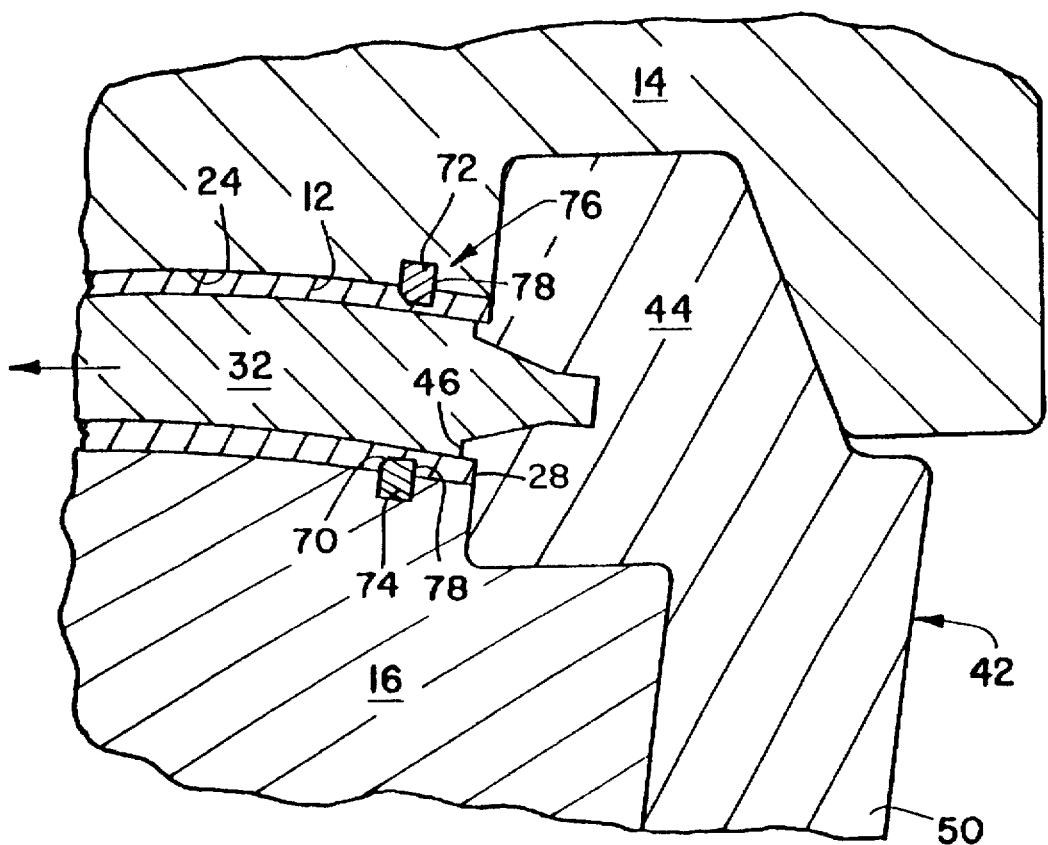
FIG. 3 is an enlarged view of a portion of the molding apparatus and the molded article positioned therein and the presence of two semi-circular rings forming a circular groove in the outer periphery of the molded article.

Referring to FIGS. 1–3, an apparatus 10 is shown for injection molding a thin wall article 12 (see FIG. 3), such as a hollow, thin wall tube. The apparatus 10 includes a first mold block 14 and a second mold blocks 16. The first mold block 14 is movable and has at least one, and preferably a plurality, of machined depressions 18 formed therein. The second mold block 16 also has at least one, and preferably a plurality, of machined depressions 20 formed therein. Preferably, the first and second mold blocks, 14 and 16 respectively, have an equal number of depressions 18 and 20 formed therein. Each depression 18 in the first mold block 14 is designed to mate with a corresponding depression 20 formed in the second mold block 16. Each pair of depressions 18 and 20 create a mold cavity 22 when the first and second mold blocks, 14 and 16 respectively, are brought together. For example, each mold block 14 and 16 can contain a semi-circular depression which when joined to the other mold block will produce a circular mold cavity. The number, size and configuration of each depression in each of the first and second mold blocks, 14 and 16 respectively, will depend upon the shape and size of the finished molded articles one wishes to mold.

It is common for a mold to have from one to sixty-four mold cavities 22. Normally, when the number of cavities 22 is greater than four, an even number of mold cavities are present. For example, a mold typically can contain four, eight, sixteen, thirty-two, sixty-four, one hundred and twenty-eight, etc. mold cavities 22.

In order to quickly and efficiently injection mold a large quantity of thin walled articles, it is possible to employ a heating mechanism to heat either one or both of the first and second mold blocks, 14 and 16 respectively. A common way of heating the first and second mold blocks 14 and 16 is by electrical energy. For maximum efficiency, it is also recommended that both of the mold blocks 14 and 16 be equipped with a cooling mechanism. A common way of cooling the first and second mold blocks, 14 and 16 respectively, is by circulating a coolant through each mold block via a number of cooling conduits. The coolant can be ordinary tap water which is maintained at room temperature. For more efficient cooling, the water can be chilled. Other types of liquid coolants can also be used to cool the first and second mold blocks 14 and 16, respectively.

This invention is workable when the first and second mold blocks, 14 and 16 respectively, are secured to a commercially available injection molding machine. The size of the injection molding machine required to mold various articles, as well as the operating conditions of the injection molding machine, i.e. temperature, pressure, cycle time, etc. will be dependent upon the size of the mold blocks, the number and size of the mold cavities machined into each mold block, and the type of material which is being molded. All of these parameters are known to those skilled in the injection molding art.

It should be noted that although this invention can be utilized with only two cooperating mold blocks, that it is more advantageous to utilize a stack mold arrangement. A stack mold will increase the efficiency of the injection molding process. In a three-piece stack mold, the middle or central mold block can be equated to the present first mold block 14 while the outer mold blocks can be equated to two of the second mold blocks 16. The combination of three mold blocks would enable twice as many articles to be injection molded during each mold cycle. In a stack mold, three mold blocks are arranged in line such that two of the mold blocks will be moved relative to the third mold block via a rack and pinion gear mechanism. The two opposite faces of the middle mold block are machined to form a plurality of depressions which cooperate with an equal number of depressions machined into the outer two mold blocks. As the stack mold is closed, the depressions come together to form mold cavities 22 for forming the outer periphery of the finished molded articles. When hollow articles are to be molded, an inner core must be brought into registration with each of the mold cavities 22 so that the interior surface of each article can be formed. A stack mold provides an economical means of injection molding multiple articles during each mold cycle.

The first and second mold blocks, 14 and 16 respectively, are designed to mate with one another and form at least one mold cavity 22 therebetween. For purposes of discussion only one cavity 22 will be described, although it should be kept in mind that the two mold blocks, 14 and 16 respectively, will normally contain a plurality of mold cavities 22. The number of actual mold cavities 22 will depend upon the size and shape of the particular articles 12 which are to be molded.

Each mold cavity 22 will have a peripheral surface 24 and first and second spaced apart ends, 26 and 28 respectively. The apparatus 10 also includes a third mold block 30 which is designed to mate with the first and second mold blocks, 14 and 16 respectively, and close off the first end 26 of the mold cavity 22. The third mold block 30 can be designed to move into and out of the mold cavity 22 on a straight path or on an arcuate path. An arcuate or curved path will be employed when the finished molded article has an arcuate shape, for example, when an arcuately-shaped, hollow elongated tube is to be molded. The mechanism needed to move the first, second and third mold blocks, 14, 16 and 30 respectively, into and out of registration with one another can be a motor, a gear and pinion arrangement, one or more hydraulic cylinders, one or more pneumatic devices, etc. Such devices are commercially available today and are well known to those skilled in the injection molding art.

Secured to and extending outward from the third mold block 30 is an elongated core pin 32. The core pin 32 is designed to extend into the mold cavity 22 when the third mold block 30 is moved into registration with the first and second mold blocks, 14 and 16 respectively. The core pin 32 forms the interior surface of the hollow, finished molded article 12, see FIG. 3. The core pin 32 has a distal end 34 onto which is secured a positioning member 36. Preferably, the positioning member 36 is a conically-shaped plug having a smooth outer surface 38. The purpose of the positioning member 36 will be explained shortly. The core pin 32 can also contain a coolant tube 40 which is used to route a coolant throughout the length of the core pin 32. Once the coolant reaches the end of the tube 40, it can flow outward and return back to its source by travelling along the outside of the coolant tube 40. Such a flow pattern is exhibited by water exiting a sprinkler system.

As mentioned above, the third mold block 30 can move along either a straight or arcuate path, as can elongated core pin 32 which is secured thereto. When the finished molded article 12 is to have a curved or arcuately-shaped hollow interior, the core pin 32 should be introduced into the mold cavity 22 along an arcuate or curved centerline A—A. Otherwise, the peripheral surface 24 of the mold cavity 22 will interfere with the forward motion of the core pin 32 and damage could occur. The amount of travel needed for the third mold block 30 and the core pin 32 will depend upon the overall length of the finished molded article 12. The length of travel can vary anywhere from between a fraction of an inch to several inches.

The apparatus 10 further includes a movable lifter 42 designed to mate with the first and second mold blocks, 14 and 16 respectively, and close off the second end 28 of the mold cavity 22. The lifter 42 contains a head portion 44 having an outwardly extending shoulder 46. The shoulder 46 is sized and shaped to be inserted into the second end 28 of the mold cavity 22 and form an inner abutment for the finished molded article 12. Preferably, the shoulder 46 has an exterior circumference which will equal the interior circumference of the finished molded article 12. The shoulder 46 should extend lengthwise into the mold cavity 22 at least about 1/32 of an inch (about 0.8 mm), and preferably about 1/16 of an inch (about 1.6 mm).

The head portion 44 of the lifter 42 also has a recess 48 formed therein which is coaxially aligned along the centerline A—A, which is also the centerline for the elongated core pin 32. Preferably, the recess 48 is also formed within the boundary of the shoulder 46 and is coaxially aligned therewith. The recess 48 is shaped and designed to receive the positioning member 36 which is secured to the distal end of the core pin 32. When the positioning member 36 engages the recess 48, the exterior surface of the elongated core pin 32 will be radially spaced away from the peripheral surface 24 of the mold cavity 22. This distance will approximately equal the thickness of the finished molded article 12.

In order to facilitate the engagement of the positioning member 36 into the recess 48, it is advantageous to form the positioning member 36 in the shape of a frusto-conic. The recess 48 is sized and configured to be the female equivalent of the male positioning member 36. This will allow the positioning member 36 to gradually enter the recess 48 and securely mate therewith. By engaging the positioning member 36 in the recess 48, one can be assured that the elongated core pin 32 is radially spaced away from the peripheral surface 24 of the mold cavity 22 along the entire length thereof. This is important, for if the exterior surface of the core pin 32 is touching the peripheral surface 24 of the mold cavity 22 at any point, then the finished molded article will have an opening formed in the side wall thereof and the article would most likely have to be rejected.

The lifter 42 also contains an arm 50 having a surface 52 which is designed to contact a corresponding surface 54 formed on the second mold block 16. The surface 52 formed on the arm 50 is arranged at an acute angle alpha ($\alpha$) relative to the surface 54 formed on the second mold block 16. By an acute angle is meant an angle of less than 90 degrees. The lifter 42 is movable relative to the second mold block 16 and can be reciprocated by contact with a movable ejector plate 56. The ejector plate 56 is shown schematically as a rectangular box in FIG. 1.

The angular disposition of the surface 52 on the lifter arm 50 relative to the surface 54 formed on the second mold block 16 enables the lifter 42 to move upward and outward away from the mold cavity 22. This action will occur after the first mold block 14 and the third mold block 30 have been withdrawn from the second mold block 16. The movement of the lifter 42 upward and outward away from both the second mold block 16 and the mold cavity 22 enables a finished molded article 12 to be freed from the surrounding mold structure. The finished molded article 12 can then be separated and removed from the depression 20 formed in the second mold block 16.

In order to facilitate removal of the finished molded article from the second mold block 16, the apparatus 10 is equipped with a movable ejector pin 58. The ejector pin 58 contains a contact surface 60 which is designed to abut the exterior surface of the finished molded article and lift it out of the depression 20 formed in the second mold block 16. The ejector pin 58 is movably positioned in an elongated bore 62 which is formed in the second mold block 16. The bore 62 is aligned approximately perpendicular to the mold cavity 22 and the ejector pin 58 is capable of extending outward through the top of the bore 62. It should be noted that the bore 62 can be angled relative to the mold cavity 22 if a perpendicular alignment is not convenient.

As the ejector pin 58 is moved upward, out of the bore 62, it will contact the finished molded article 12 and push it away from the second mold block 16. This action will allow the finished molded article 12 to be displaced out of the mold. When it is necessary to keep the finished molded article 12 clean, a robot or a suction mechanism can be used to actually grab the molded article 12 and remove it from the mold. This will provide positive assurance that the molded article is not present in the mold when the first and second mold blocks, 14 and 16 respectively, are again closed for a subsequent molding operation.

The desired length of travel needed for the ejector pin 58 to unseat the finished molded article will depend upon the size and shape of the mold cavity 22. However, for most applications, a length of travel of from between about 0.25 inch to about 0.75 inches (about 6.4 mm to about 19 mm) is sufficient. The ejector pin 58 can be actuated by the same ejector plate 56 which is used to move the lifter 42. The ejector plate 56 will enable both the lifter 42 and the ejector pin 58 to move simultaneously. Such action is possible in freeing the finished molded article because the lifter 42 will move upward and outward at an angle while the ejector pin 58 will raise the finished molded article up and out of the depression 20.

The apparatus 10 further includes an injection nozzle 64 having at least one outlet 66 which is in fluid communication with the mold cavity 22. The injection nozzle 64 is shown secured to the first mold block 14 although it could be mounted in the second mold block 16 if desired. The injection nozzle 64 is designed to deliver a predetermined quantity of molten material to the mold cavity 22 at a desired time. The molten material is then allowed to solidify in the mold cavity 22 and form a finished molded article 12, see FIG. 3.

The molten material can be any type of moldable thermoplastic material such as polyethylene, polypropylene or some combination thereof. Other thermoplastic materials can also be used. The material can have a high density or a low density and should have a melting point which is sufficiently high to prevent burning or charring during the injection molding cycle. High density polyethylene is one such material that is desirable for forming a thin walled tube which can be used as the inner tube or plunger of a two-piece tampon applicator. High density polyethylene is available from a number of sources. Two of such sources include Union Carbide Chemicals and Plastics Company, Inc. having a sales office at 3030 Warrenville Road, Suite 870, Lisle, Ill. 60632 and Quantum Chemical Corporation, USI Division, having an office at 11500 Northlake Drive, Cincinnati, Ohio 45249.

The injection nozzle 64 can be located anywhere along the length of the mold cavity 22 but preferably, is located intermediate the two ends 26 and 28. When the finished molded article has a uniform wall thickness, it is advantageous to position the injection nozzle 64 an equal distance between the two ends 26 and 28. Should the wall thickness vary, it then becomes advantageous to position the injection nozzle 64 at a point where an equal volume or amount of molten material can flow in opposite directions toward the two ends 26 and 28.

Normally, a gate will be formed on the exterior surface of the finished molded article where the injection nozzle 64 is located. For aesthetic purposes, it is advantageous to keep the depth of any gate to a minimum. This is especially true in cases where the finished molded article will have to interact with another member.

Referring now to FIG. 2, an alternative embodiment of an injection nozzle 68 is shown having a pair of outlets 70 and 72. Such a nozzle 68 is beneficial to use when molding small diameter articles, such as hollow tubes 12' and 12". The small diameter tubes 12' and 12" enable the single injection nozzle 68 to supply molten material to both mold cavities simultaneously and this can increase the efficiency of the molding operation and substantially reduce the overall cost of the finished product.

Referring to FIG. 3, an enlarged view of a portion of the apparatus 10 and the finished molded article 12 is shown. The article 12 is depicted as having a circular groove 70 formed therein. The groove 70 is located adjacent to the second end 28 of the mold cavity 22, see FIG. 1. The groove 70 can vary in size and shape but preferably has a depth of at least about 0.004 inches (about 0.1 mm) and a width, measured along the length of the finished molded article 12, of at least about 0.02 inches (about 0.5 mm).

The groove 70 is formed by a pair of mating semi-circular rings 72 and 74. The first semi-circular ring 72 is secured to the first mold block 14 and the other semi-circular ring 74 secured to the second mold block 16. The two semi-circular rings 72 and 74 are sized and configured to mate with one another when the first and second mold blocks, 14 and 16 respectively, come together and form a circular ring 76. The circular ring 76, spanning approximately 360°, extends into the mold cavity 22 and forms the circular groove 70 in the exterior periphery of the finished molded article 12. Although one could use only a single semi-circular ring 72 or 74 and form a semi-circular groove in the outer periphery of the finished molded article 12, it is advantageous to utilize a pair of mating semi-circular rings 72 and 74 so as to form an aesthetically pleasing appearance on the finished molded article 12.

In actual operation, it is the semi-circular ring 74 secured to the second mold block 16 which will hold the finished molded article 12 stationary while the core pin 32 is withdrawn therefrom. The other semi-circular ring 72 is affixed to the first mold block 14 and will be separated from the finished molded article 12 when the first mold block 14 is removed.

It should also be noted that the shoulder 46 formed on the lifter 42 also assist in holding the finished molded article 12 stationary while the core pin 32 is withdrawn from the finished molded article 12. The shoulder 46 cooperates with the top surface of the second mold block 16 and actually pinches or clamps the end of the finished molded article 12 against the second mold block 16 and prevents the finished molded article 12 from moving along with the core pin 32. However, the pinching action of the shoulder 46 will not be sufficient by itself to hold the finished molded article 12 stationary. Therefore the semi-circular ring 74 is needed to assure that the finished molded article 12 will remain in place until the core pin 32 is fully withdrawn.

Referring again to FIG. 1, the first and second mold blocks, 14 and 16 respectively, are shown having three circular rings 76 situated adjacent to the first end 26 of the mold cavity 22 and one circular ring 76 situated adjacent to the second end 28 of the cavity 22. The number of rings 76 which are present is optional but the presence of one or more rings 76 is beneficial in holding the molded article 12 stationary as the core pin 32 is removed. For aesthetic purposes, one may desire to utilize an equal number of rings 76 adjacent each end 26 and 28, respectively.

Referring to FIGS. 1 and 3, it should also be noted that the circular rings 76 can be spaced anywhere along the length of the cavity 22 if desired. Each circular ring 76 will form a corresponding circular groove 70 in the outer periphery of the finished molded article 12. If one wished to utilize only one circular ring 76, then it would be advantageous to position the circular ring 76 adjacent to the second end 28. The reason for this is that the semi-circular ring 74 will hold the finished molded article 12 stationary at a location next to the lifter 42. This location is away from the area where the core pin 32 is being withdrawn.

Referring again to FIG. 3, each circular groove 70 should be configured such that it has a side wall 78 which is aligned approximately perpendicular to the peripheral surface 24 of the mold cavity 22. This side wall 78 can then act as a stop which prevents the finished molded article 12 from moving along with the core pin 32 as it is withdrawn. The side wall 78 should be aligned on a surface of the finished molded article 12 which is away from the direction of withdrawal of the core pin 32 from the finished molded article 12. In other words, the side wall 78 should be facing the lifter 42.

METHOD

The method of injection molding a thin walled article, especially thin walled tubes, using the molding blocks described above, includes the following steps. First, the lifter 42 and the core pin 32 are moved into registration with the second mold block 16. Preferably, the lifter 42 is moved into registration with the second mold block 16 before the core pin 32. This will allow the positioning member 36, which is secured to the distal end of the core pin 32, to gradually engage the recess 48 formed in the lifter 42. The third mold block 30 with the attached core pin 32 and the lifter 42 can be simultaneously moved together, if desired, since the travel required of the third mold block 30 will normally be greater than the travel required of the lifter 42. However, the movement of these members must be timed such that the lifter 42 is in place when the positioning member 36 engages in the recess 48. Otherwise, damage could occur to the mold.

The second step of the method encompasses moving the first and second mold blocks, 14 and 16 respectively, into contact with one another to form the mold cavities 22. Molten material is then introduced into each mold cavity 22 through the injection nozzles 64. Typically, there will be an injection nozzle 64 for each mold cavity 22 unless a double outlet nozzle 68 is utilized, as shown in FIG. 2. The molten material, preferably a thermoplastic, is allowed to solidify to form a finished molded tube 12. The amount of solidification needed will depend upon the characteristics of the material. For some materials, it is possible to open the mold while the material is still in a semi-molten state.

The method includes opening the mold apparatus 10 by separating the first and second mold blocks, 14 and 16 respectively. Typically, the first mold block 14 is separated from the second mold block 16 which is held stationary. Once the first mold block 14 is moved away from the second mold block 16, the third mold block 30 can be withdrawn. With the withdrawal of the third mold block 30, the core pin 32 is simultaneously removed from inside the finished molded article 12. Lastly, the lifter 42 is moved upward and outward, as depicted in FIG. 1, away from the finished molded article 12. This frees the finished molded article 12 and allows it to be recovered by a removal device, such as a robot, if desired. After the finished molded article 12 is withdrawn from the apparatus 10, the mold can again be closed for a subsequent molding operation. The speed or cycle time for closing the mold 10, molding a finished article 12 and then opening the mold, will vary depending upon the equipment used, the type of material being molded, the size of the cavities, etc. A normal cycle time for molding a small hollow, thin walled tube formed from a commercially available thermoplastic resin may range from about one second to about three minutes. Preferably, the cycle time will be less than about sixty seconds, and most preferably, the cycle time will be less than about ten seconds.

In order to facilitate removal of the finished molded article 12 from the depression 20 formed in the second mold block 16, one can employ an ejector pin 58. When the ejector pin 58 is present, it can be moved into contact with the outer periphery of the finished molded article 12 at the same time as the lifter 42 is being moved away from the finished molded article 12. This simultaneous movement is beneficial in maintaining a relatively short overall cycle time.

The movement of the ejector pin 58 and the lifter 42 occur after the first mold block 14 has separated from the second mold block 16 and the core pin 32 has been withdrawn from inside the finished molded article 12. The shoulder 46 cooperates with the second mold block 16 and pinches the end of the finished molded article 12 therebetween. This action helps to prevent the finished molded article 12 from moving out of the depression 20 as the core pin 32 is withdrawn. With the first and third mold blocks, 14 and 30 respectively, moved out of the way, the lifter 42 can be moved upward and outward away from the finished molded article 12 thereby freeing the shoulder 46 from the second end 28 of the finished molded article 12.

When the apparatus 10 includes a pair of semi-circular rings 72 and 74 which mate to form a circular ring 76, a circular groove 70 will be formed in the exterior surface of the finished molded article 12. The semi-circular ring 72 is affixed to the first mold block 14 and will move away from the groove 70 as the first mold block 14 is withdrawn. The second semi-circular ring 74 is affixed to the second mold block 16 and will remain in the groove 70 as the third mold block 30 and the elongated core pin 32 are withdrawn. The semi-circular ring 74 will assist the shoulder 46, formed on the lifter 42, in holding the finished molded article 12 stationary. This will enable the core pin 32 to be completely withdrawn before the lifter 42 moves away from the finished molded tube 12.

While the invention has been described in conjunction with two specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A method of injection molding a thin walled article using a mold having first and second mold blocks which are mateable with one another to form a mold cavity therebetween, said mold cavity having a peripheral surface and first and second ends, a third mold block designed to mate with said first and second mold blocks and close off said first end of said mold cavity, said third mold block having an elongated core pin which extends into said mold cavity when said third mold block mates with said first and second mold blocks, a lifter designed to mate with said first and second mold blocks and close off said second end of said mold cavity, and said elongated core pin being engageable with said lifter to assure that said core pin is radially spaced away from said peripheral surface of said mold cavity, said method comprising the steps of:

a) moving said lifter into registration with said second mold block;

b) moving said third mold block and attached core pin into registration with said second mold block such that said core pin mates with said lifter;

c) closing said first and second mold blocks to form said mold cavity;

d) inserting molten material into said mold cavity and allowing said molten material to solidify to form a molded thin walled article;

e) opening said mold by separating said first and second mold blocks;

f) withdrawing said core pin from inside said molded article; and g) withdrawing said lifter from registration with said second mold block and removing said molded thin willed article from said second mold block.

2. The method of claim 1 wherein said lifter and core pin are simultaneously moved into registration with said second mold block.

3. The method of claim 1 wherein said second mold block contains a bore which communicates with said mold cavity and an ejector pin is movably positioned within said bore, and said ejector pin is moved into contact with said molded article after said first and second mold blocks have been separated for the purpose of removing said molded article from said second mold block.

4. The method of claim 3 wherein said ejector pin and said lifter are simultaneously moved relative to said second mold block by an ejector plate so as to remove said molded thin walled article from said second mold block.

5. The method of claim 1 wherein each of said first and second mold blocks contains a semi-circular ring and each of said semi-circular rings is sized and configured to mate with one another and form a circular ring which extends into said mold cavity and create a circular groove in an outer periphery of said molded article, at least one of said semi-circular rings present in said second mold block holding said molded article stationary as said core pin is withdrawn.

6. A method of injection molding an arcuately-shaped, thin walled article using a mold having first and second mold blocks which are mateable with one another to form a mold cavity therebetween, said mold cavity having a peripheral surface and first and second ends, a third mold block designed to mate with said first and second mold blocks and close off said first end of said mold cavity, said third mold block having an elongated core pin which extends into said mold cavity when said third mold block mates with said first and second mold blocks, a lifter mateable with said first and second mold blocks to close off said second end of said mold cavity, and said elongated core pin engageable with said lifter to assure that said core pin is radially spaced away from said peripheral surface of said mold cavity, said method comprising the steps of:

a) moving said lifter into registration with said second mold block;

b) moving said third mold block and attached core pin into registration with said second mold block such that said core pin mates with said lifter;

c) closing said first and second mold blocks to form said mold cavity therebetween;

d) filling said mold cavity with a molten material and allowing said molten material to solidify to form an arcuately-shaped, thin walled article;

e) opening said mold by separating said first and second mold blocks;

f) withdrawing said core pin from inside said arcuately-shaped, thin walled molded article; and g) moving said lifter away from registration with said second mold block and away from said arcuately-shaped, thin walled molded article.

* * * * *